United States Patent [19]
de Figueiredo

[11] 3,927,532
[45] Dec. 23, 1975

[54] THERMOMOLECULAR RECTIFIER

[75] Inventor: Antonio M. C. de Figueiredo, Hartford, Conn.

[73] Assignee: The Raymond Lee Organization, Inc., New York, N.Y.; a part interest

[22] Filed: Nov. 26, 1974

[21] Appl. No.: 527,211

[52] U.S. Cl. ................................................ 60/721
[51] Int. Cl.² ......................................... F03G 7/00
[58] Field of Search ............ 60/516, 549, 531, 721, 60/650, 682, 651, 671

[56] References Cited
UNITED STATES PATENTS 3,587,227   6/1971   Weingarten .................... 60/671 X
3,702,532   11/1972  Low et al. ....................... 60/516

*Primary Examiner*—Allen M. Ostrager
*Attorney, Agent, or Firm*—Howard I. Podell

[57] ABSTRACT

Apparatus for the generation of power based on the difference of partial pressures of a fluid or gas in a static field containing two different fluids or gases such that the two substances are affected to a different degree by such a field. Membrane barriers are set up so as to contain the substance most strongly affected by the field letting the other diffuse in the direction of reduced pressure with the subsequent flow being used in the generation of power.

4 Claims, 3 Drawing Figures

3,927,532

THERMOMOLECULAR RECTIFIER

SUMMARY OF THE INVENTION

This invention relates to an apparatus for the generation of power based on the difference of partial pressures of a fluid or gas in a field containing two different substances such that one of them is more strongly affected by that field.

The apparatus involves a closed system of a mixture of two fluids of different masses which are located in a chamber subjected to a gravitational or centrifugal field. Opposing walls of the chamber are each formed of a permeable membrane which is impervious to the heavier fluid of the mixture, and which permits diffusion of the molecules of the other fluid of the mixture. The membranes are located as the opposing walls of the chamber which are subjected to the gravitational or centrifugal field to which the chamber is subjected. The external walls of the chambers are joined together by piping which leads to a power generator operated by the flow of fluid through the piping, with said piping also passing through a reservoir chamber.

BRIEF DESCRIPTION OF THE DRAWINGS

The objects and features of the invention may be understood with reference of the following detailed description of an illustrative embodiment of the invention, taken together with the accompanying drawings in which.

DESCRIPTION OF THE PREFERRED EMBODIMENT

Figure 1:
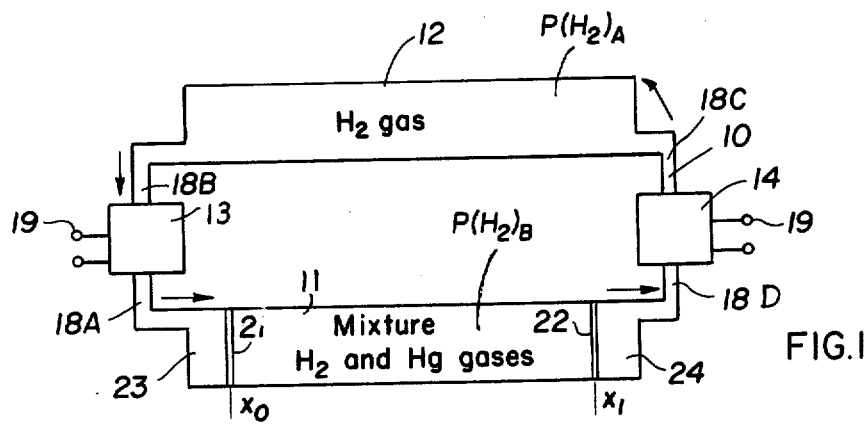
FIG. 1 is a block diagram of the apparatus.

Turning now descriptively to the drawings, in which similar reference characters denote similar elements through the several views, FIG. 1 illustrates a block diagram of the apparatus 10 in which the mixture of two gases are stored in diffusion chamber 11, with said gases being of different molecular weights. For purposes of illustration, two gases such as hydrogen and mercury have been selected, although any other two gases of different masses might be selected where the lighter of the two gases is permeable through a membrane 21 and 22 and the other gas is impermeable through said membrane.

The opposing walls of the diffusion chamber 11 are bounded by membranes 21 and 22 both of which are selected so as to be permeable to hydrogen gas and to be impermeable to mercury vapor. The external chamber 23 bounded by membrane 21 at position $X_0$ is joined by tubing 18A which leads from the output of a gas powered generator 13. Inlet tubing 18B of turbine generator 13 leads from reservoir 12, with the exhaust tubing 18C of generator 14 led into reservoir 12. Chamber 24 which forms the external boundary of membrane 22 at the other opposing wall $X_1$ of the diffusion chamber 11 is joined to inlet tubing 18D of turbine 14. Gas turbines 13 and 14 may drive electrical generators which terminate in power take-offs 19.

Figure 2:
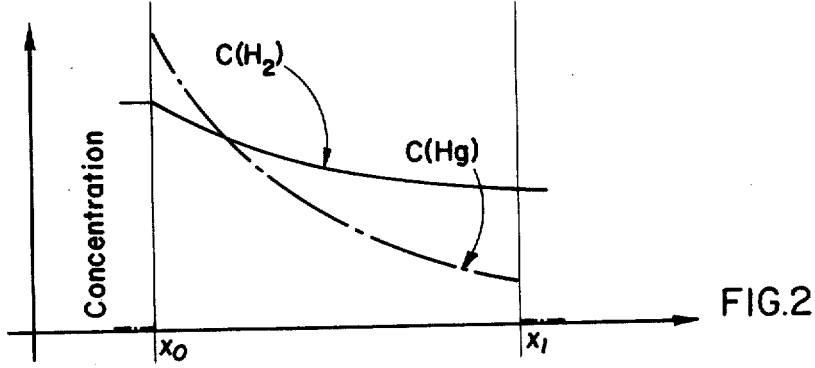
FIG. 2 is a pressure diagram of the fluids in the diffusion chamber under the same force field.

In operation, a gravitational or centrifugal force field is established across diffusion chamber 11, with the direction of said field being perpendicular to the plane of the opposing parallel wall membranes 21 and 22 of chamber 11. The gravitational or centrifugal field in chamber 11 results in a variation of partial pressures of the two gases of the mixture throughout chamber 11 as shown in FIG. 2. A force field as described above is set up so that both chambers, 11 and 12, are subject to the field. Both the mercury gas and the hydrogen gas in chamber 11 will be affected by the field, the heavier gas being affected much more strongly as shown in FIG. 2, where the curve for the heavier gas C(Hg) is significantly steeper than that of the lighter gas C(H). The non-linear concentration of the heavier gas throughout the chamber 11 causes a non-linear displacement of the lighter gas as shown in FIG. 3 where the slope of the hydrogen contained in the mixture in chamber 11 is shown non-parallel to that contained in a pure state in chamber 12.

Figure 3:
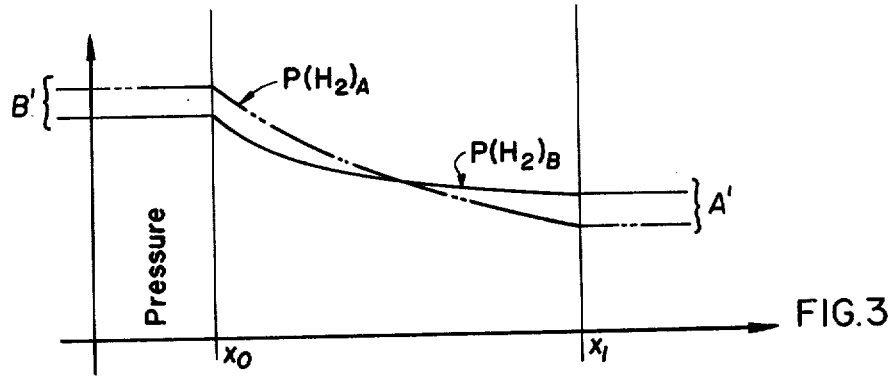
FIG. 3 is a diagram of the partial pressures of hydrogen in the two different chamber of the apparatus.

In FIG. 3 illustrating the contrast in slope between that of the lighter gas in a pure state and that in the mixture, the partial pressure of hydrogen gas in chamber 11 is represented by $P(H_2)_B$ and the partial pressure of the pure hydrogen in chamber 12 is represented by $P(H_2)_A$. The membranes 21 and 22 serve to contain the heavier gas mercury in the chamber 11 while permitting free passage to the lighter gas hydrogen. The concentration of the lighter gas is therefore equal on both sides of the membranes as illustrated in FIG. 3. The two power turbines 13 and 14 work from the two pressure differentials labeled A' and B' in FIG. 3. The direction of flow is indicated by the arrows of FIG. 1.

It is to be noted that other mixtures of vapors or liquid fluids may be employed, with the primary requirement being that a mixture of fluids shall be placed in the diffusion chamber 11, the molecules of the mixture being of different masses from each other, and with the chamber walls being fitted with membranes 21 and 22 which are permeable to the molecules of the lighter gas of the mixture and impermeable to the heavier gas.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. Apparatus for the generation of power based on the difference of partial pressures of a fluid mixture in a force field, where the fluid mixture consists of a mixture of two sets of molecules with the molecules of one set being acted upon by the force field in a discriminatory fashion to the molecules of the other field, said apparatus comprising a diffusion chamber in which the mixture of molecules is placed, with the said diffusion chamber being bounded on two opposing walls of the chamber by a membrane which is relatively permeable to the molecules of the fluid of the mixture in the diffusion chamber which is least affected by the force field and impermeable to the molecules of the fluid of the mixture in the diffusion chamber most affected by the force field, with said apparatus placed in a said force field with the opposing membrane walls of the diffusion chamber located in planes at right angles to the direction of the force field, with two external chamber, each bounding an opposed membrane wall of the diffusion chamber, linked together by means of tubing which leads through a fluid pressure-operated power generator and to a reservoir chamber containing molecules of the fluid in the mixture that is permeable to the membrane, such that when the force field is applied to the diffusion chamber, the partial pressure of the permeable fluid is greater inside the diffusion chamber against one membrane wall then is said partial pressure against the opposing membrane wall, with the pressure of the permeable fluid in the external chambers bounding the membrane being of a magnitude between said partial pressures.

2. The combination as recited in claim 1 in which the field is a gravitational or centrifugal force field, with the molecules of one fluid being heavier than the molecules of the other fluid, and with the membrane relatively permeable to the molecules of the lighter fluid and relatively impermeable to the molecules of the heavier fluid.

3. The combination as recited in claim 2 in which the fluid mixture comprises a mixture of hydrogen and mercury vapor molecules.

4. The combination as recited in claim 1 in which the mixture consists of an ionic solution of fluids in a liquid state, in an electric field.

* * * * *